United States Patent [19]

Hicks

[11] Patent Number: 5,097,292
[45] Date of Patent: Mar. 17, 1992

[54] FILM DRIVE SYSTEM FOR PHOTOGRAPHIC PRINTERS

[76] Inventor: Ray Hicks, 2605 Corunna Rd., Flint, Mich. 48503

[21] Appl. No.: 359,852

[22] Filed: May 31, 1989

[51] Int. Cl.$^5$ ............................................. G03B 27/62
[52] U.S. Cl. ...................................... 355/75; 355/133
[58] Field of Search ............... 355/38, 40, 41, 77, 133, 355/75; 242/71, 71.6, 71.9

[56] References Cited

U.S. PATENT DOCUMENTS 4,707,120 11/1987 Yamamoto ............................ 355/38
4,933,716 6/1990 Imamura et al. .................. 355/75 X Primary Examiner—L. T. Hix
Assistant Examiner—D. Rutledge
Attorney, Agent, or Firm—Krass and Young

[57] ABSTRACT

The invention is an improved removable film transport for photographic equipment. A roll of film is transported through the drive by a drive reel, a take-up reel, and a supply reel. The drive allows the presentation of a selected frame from the roll of film in precise relationship to photographic equipment on which it may be mounted, such as a printer or color analyzer. Incremental adjustment of the X-axis and Y-axis of the film in relation to the photographic equipment is easily located through the use of a stepper motor and a pair of nested, sliding and interconnected frames. The drive also includes a reading device for sensing and decoding machine readable marks placed on the roll of film, and includes the necessary interface between the drive and a computer or computer network. A special drive roller mechanism minimizes risk of damage to the surface of the film during operation of the drive.

6 Claims, 2 Drawing Sheets

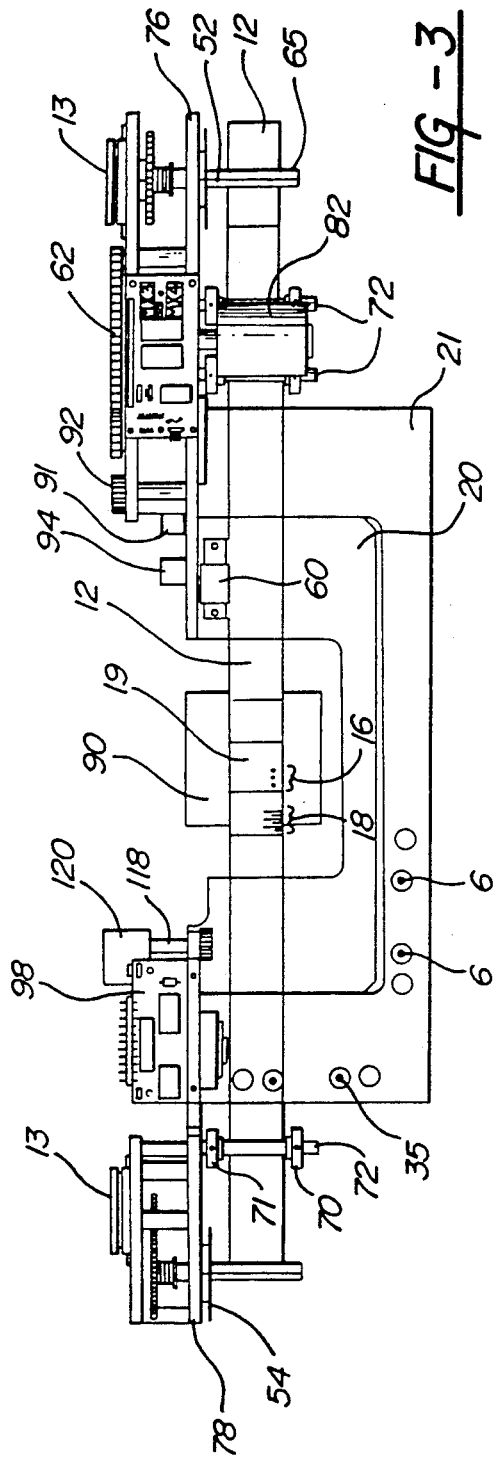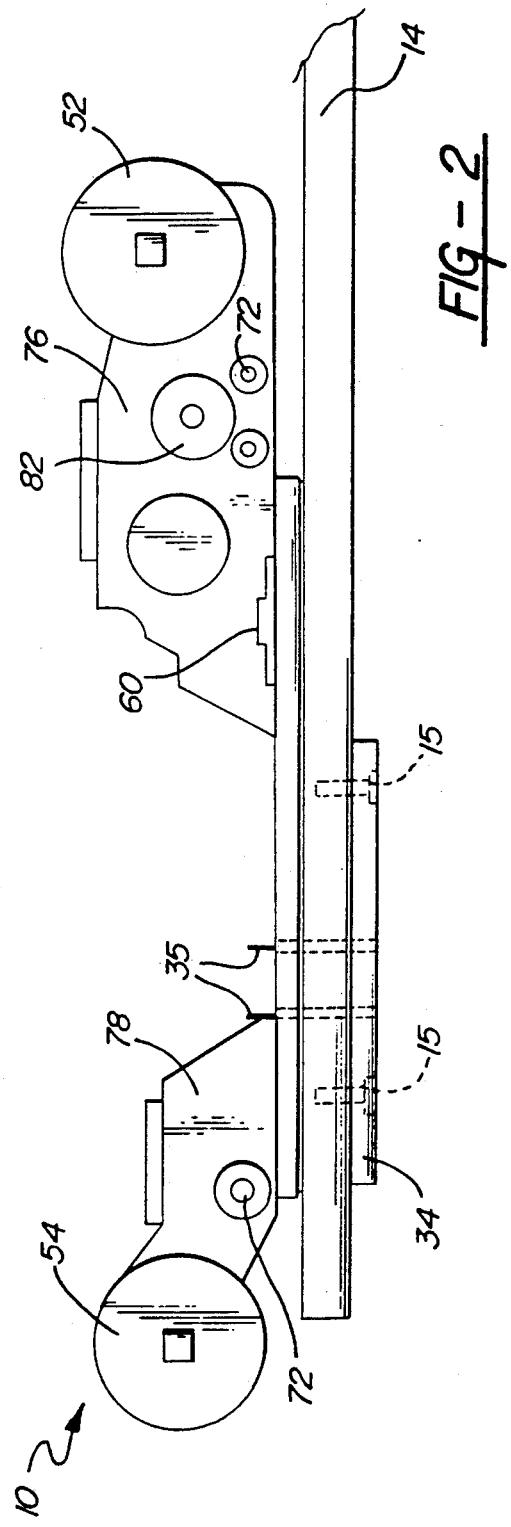

FILM DRIVE SYSTEM FOR PHOTOGRAPHIC PRINTERS

FIELD OF THE INVENTION

The invention relates to removable drive mechanisms for transporting film through automated photographic equipment, for example, printers and color analyzers.

BACKGROUND OF THE INVENTION

Commercial photographic printers are devices capable of exposing photographic positive paper in response to illumination from photographic negatives. These processes are well-known in the art. Because of the economies of scale, it is desirable to print photographs in a commercial environment as quickly and accurately as possible. In the past, commercial photographic printing equipment utilized manual techniques for transporting large reels of film through the printer. Typically a printer operator would hand crank a "take-up" reel to pull a roll of negatives from a feed reel, across the exposure window or "gate" and the frame of the printer. This system was prone to operator error and damage to the film. Accordingly, efforts were undertaken to develop an automated approach to the process, and in recent years, mechanically operated film drive mechanisms have been used to transport the film through such printers. To allow stoppage of the film on a frame-by-frame basis, individual negatives have, in the past, been coded with optically readable punched holes, or codes embedded in the negative film, which are readable by various code or character recognition devices. More recently, this encoded information has been used to direct the printer to automatically print certain pre-determined package information, e.g., the number and size of a group of photographs to be printed from a specific negative.

These devices have many inherent drawbacks. Since there are a large number of manufacturers of photographic equipment, and since much older model equipment exist in the industry which is perfectly serviceable, it is desirable to provide a film drive which is easily retro-fitted to existing equipment. However, the process of retro-fitting must take into consideration the inherent space limitations (between the surface of the film plane and the lens shroud of the conventional printer, for example) while insuring that the precise distances from the film surface to the lenses used to expose the film must be maintained. Moreover, conventional film drives allow orientation of the film to the equipment in a pre-determined relationship only, that is, the longitudinal axis of a reel of negative film cannot easily be changed in relation to a photographic printer. Film shot in "portrait" format (where the vertical dimension of the developed photograph exceeds the horizontal dimension) cannot be printed in the "landscape" format (where the horizontal dimension of the print exceeds the vertical dimension).

Further, it is desirable to allow the easy removal and replacement of the pre-existing film drive mechanism, to allow the equipment owner the flexibility of returning the equipment to its original configuration.

A further drawback of existing film drives is the use of pressure feed rollers to transport the film. In this method, the film is squeezed between two compliant rollers to effectuate film transport. This method allows the presence of contaminants between the rollers to damage the surface of the film, and does not accommodate tensioning differences arising from unequal pressures placed on the film as a result of the differing diameters of film disposed on the feed and take up reels during operation.

A still further limitation of existing drives is their inability to accommodate varying widths of film, for example, 16 mm versus 35 mm film widths. Further, existing drive mechanisms cannot selectively position the film in relation to the so-called "gate" of the printer, that is, the location on the printer over which the individual negative frame is positioned prior to the actual printing process. If the film position, or the center of the subject in the frame of the negative is incorrect, there is no current mechanism for incremental altering the X or Y position of the center of the subject in the photograph so as to obtain a print which is visually balanced. Existing film drives are further limited in their ability to automatically read, decode, and act upon information encoded on or in the film negative. Typically, existing drives can only move sequentially through a series of frames, and cannot automatically locate and modify printing of frames in response to a pre-programmed set of instructions. Likewise existing film-drives have no capability of providing feed-back data to either the equipment in which they are mounted, or to other data receiving devices.

The present invention is designed to overcome these and other limitations, by providing a film-drive mechanism which is easily removable, adjustable in the X and Y axis in relation to most photographic equipment, and well-adapted to communicating with computers and computer networks.

SUMMARY OF THE INVENTION

It is an object of the invention to provide an improved film drive mechanism for photographic equipment which is removable.

It is a further object of the invention to provide an improved film drive for photographic equipment which is easily incremented in position in relation to said photographic equipment to allow easy orientation of said drive to a precise position in relation to said equipment.

It is a further object of the invention to provide an improved film drive for photographic equipment which allows for machine reading of a variety of codes for automated operation of photographic equipment, and for communication with computers and computer networks.

It is a further object of the invention to provide an improved film drive for photographic equipment which accommodates a variety of film sizes and orientations, and which minimizes risk of damage to the film during the transport process.

DETAILED DESCRIPTION OF THE DRAWINGS

FIG. 2 is a front view of the invention.

FIG. 3 is a top view of the invention.

DESCRIPTION OF THE PREFERRED EMBODIMENT

Figure 1:
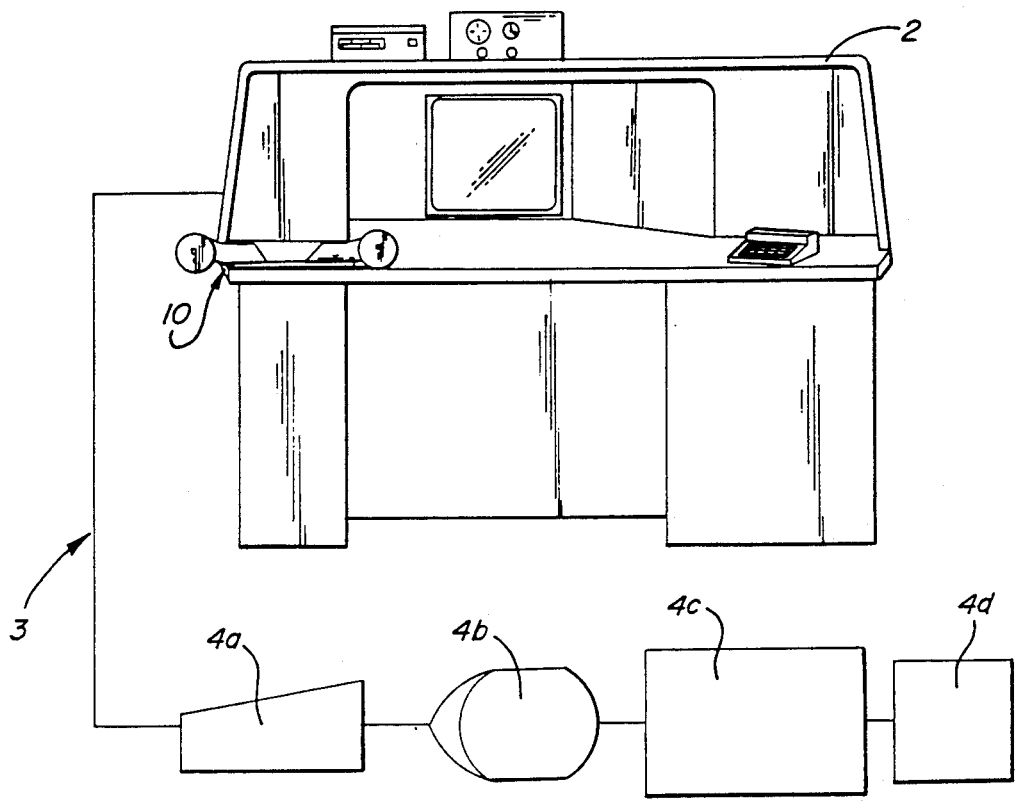
FIG. 1 is a front view of the invention mounted in a typical photographic printer, showing simplified interfaces to computers, input/output devices and computer networks.

In the preferred embodiment, such as is shown in FIG. 1, a commercial photographic printer 2 is equipped with the present invention 10. A simplified network 3, and computer with peripheral devices 4a through 4d.

Referring to FIGS. 2 and 3, a locater plate 34 is mounted to the underside of a printer table 14 following removal of the original film drive mechanism. The locator plate is preferably affixed to the printer table 14 with bolts 15 to allow subsequent removal, yet insure precise placement. The film transport assembly 10 is affixed to the locator plate 34 by the use of locator pins 35, which protrude upward through the printer table, and bolts 15.

The film transport assembly 10 is comprised of two main frame pieces, outer frame 21 and inner frame 20. Mounted to the inner frame 20 are first vertical support bracket 76 and second vertical support bracket 78.

Mounted on first vertical support bracket 76 are a series of components designed to locate and feed a continuous roll of photographic film 12. Film feed spool 52 serves to hold and dispense the rolled film 12. Take-up reel 54, mounted on second vertical support bracket 78, serves to accumulate rolled film 12. Both feed and receiving spools removable from the drive, and are mounted to the drive on clutched shafts which are connected to separate drive and take-up motors 13. Typically, such roll of film 12 contains a series of individual frames 19, each constituting a single photographic exposure. In the preferred embodiment, each frame has been pre-marked, by punches 16 or optically embedded marks 18, said marks containing data important to the printing process, such as frame number and order information. The roll 12 is fed around guide rollers 72. The film is positioned in relation to the ends of said guide roller by adjustable collars 70 and 71. Movement of these collars 70 along the longitudinal axis of the roller permits regulation of the dimension between inner collar 70 and outer collar 71. Film 12 is fed from spool 52 under first guide roller 72, over metering cylindrical roller 82, and under second guide roller 72. Metering cylindrical roller 82 is coated with a thin coating of compliant material, and is driven by stepper motor 62. To assure tension on the film drive reels, each reel is driven by individual motors 13 through a clutched shaft 65. Additional tension may be supplied to the film by virtue of a bailed shaft at either the take up or feed side of the drive, to allow high speed movement of the film reels. The metering roller and tension motors are controlled by virtue of either a dedicated controller, or under computer command from an external computer or control device. Metering cylindrical roller 82 and guide rollers 72 are separated by a distance greater than the thickness of the film 12. In this fashion, there is no squeezing of the film between rollers, thereby reducing the risk of damage to the film 12 during transfer.

After passing under second guide roller 72, the film is fed across an opening in the drive assembly. The guide rollers 72 are not driven, but run freely on bearings or bushings. When in position on, for example, the printer table 14, this opening corresponds to the position of the negative stage 90 or "gate" in the photographic printer, over which the negative frame 19 is positioned during the printing process. For accurate placement of the negative frame 19 over stage 90, it is necessary that the center of the negative be selectively movable in both the X-axis (the longitudinal axis of the film, i.e., toward or away from the receiving spool) and in the Y-axis (toward or away from the operator).

This positioning is achieved in several ways. First, film size is selectable utilizing film size selector knob 92. Film size selector 92 adjusts the position of a hall-effect sensor 94 mounted on inner frame 20. A magnet 91 mounted on outer frame 21 induces a magnetic field which is measured by the hall-effect sensor 94. When said sensor senses a change in the position of inner frame 20 in relation to outer frame 21, as a result of movement of size selector 92 sensor 94 sends a pre-determined signal to servo motor 98, which interconnects both frames 20 and 21. Through the use of comparative logic circuitry, servo-motor 98 is operated to bring frames 20 and 21 into position with one another so as to insure that film size changes which are input through the use of the film size selector knob are translated into the physical repositioning of inner frame 20 by servo motor 98, causing the longitudinal centerline of film 12 to remain positioned over the center of the negative stage 90. To further accommodate multiple film sizes, the drive assembly is equipped with film guide rollers 72. At least one of said rollers is further equipped with moveable collars 70 and 71. By placement of said collars in pre-determined positions along the axis of said rollers, the collars 70 and 71 form keepers which guide the film within the designated dimension set between the collars 70 and 71.

Outer frame 21 is equipped with openings 6 disposed on two adjacent sides of said frame. These openings are identical in dimension and spacing, and are disposed to locate said drive 10 in such position that the center line of said roll 12 will lie in the approximate center of the negative stage 90 of the printer, whether the drive is oriented in the X-axis or the Y-axis in relation to the negative stage.

In the preferred embodiment, the inner frame 20 is equipped with a reader device 60, preferably of the pneumatic variety. Reader device 60 is disposed on the inner frame 20 so as to allow one edge of roll film 12 to pass in proximity to the reader device 60. The edge of the roll 12 is preferably marked with encoded data in the form of a series of holes 19 which perforate the edge of the film in a pre-determined pattern. Among the information which may be encoded on the roll 12 are frame numbers, color balance and density information, and special data which may designate problems with a particular photographic subject, for example, a "blink" where the photographic subject is an individual who blinked just as the photo was taken, indicating the need for a reprint. This encoded data is preferably used to set parameters which the printer may use to print or skip the printing of a photograph, to search for and print a selected frame or frames, to skip the printing of selecting frame or frames or to alter the number and size of prints to be made from a particular negative. As shown in FIG. 1, the encoded data may also be simultaneously read by reader device 60, and transferred to a computer 4d, a computer memory device 4c or a computer network line 3, for use in reporting, for storage and later retrieval, or for use elsewhere in the commercial photographic process, for example, the print cutting and bagging station. The stepper motor movement above described, as well as the positional feedback from hall effect sensor 94, may also be transferred via the network to a computer.

Figure 4:
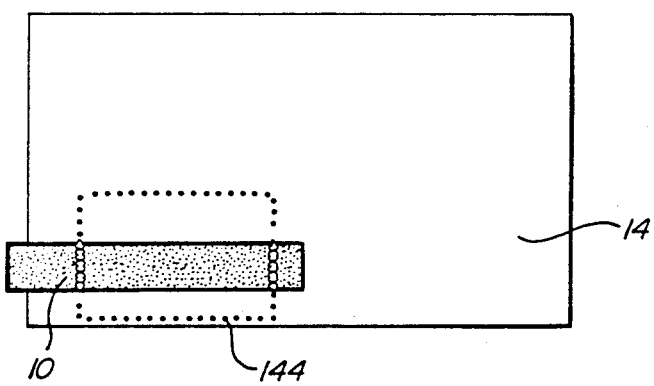
FIG. 4 is a view of the invention oriented on a printer surface in the X-axis orientation
Figure 5:
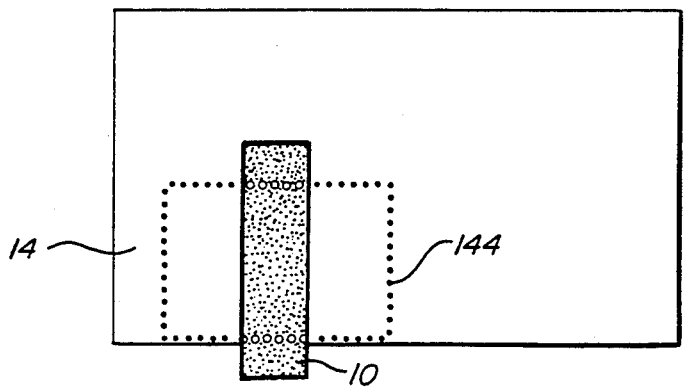
FIG. 5 is a view of the invention oriented on a printer surface in the Y-axis orientation.

With reference now to FIGS. 4 and 5, it is commonly known that photographs and negatives are typically not of symmetrical height and width. One dimension typically is longer than the other, such as with portrait or landscape orientations. The present invention is adaptable to either orientations. FIG. 4 shows the invention on a portion 144 of the printer table 14 surface in the X-axis orientation, and FIG. 5 shows the invention in the Y-axis orientation.

Because the actual taking of the photographs is outside the control of the commercial photographic processing facility, such facilities are frequently presented with the task of substantial editing and quality control. As an example, a series of subjects may be poorly centered in the frame of the negative. The present invention allows the movement of the individual negative in the X and Y axis by virtue of the stepper motor 62, and the inner and outer frames 20 and 21. The stepper motor is capable of bi-directional rotational operation in extremely fine increments, allowing repositioning of the negative frame in the X-axis. The inner and outer frames 20 and 21 are interconnected as follows. The mating surfaces of the inner and outer frames, when seen in cross sectional elevation, are V grooves. Located between these grooves are roller bearings. Fixed steps limit the linear movement of frames 20 and 21 within defined limits. A thumbscrew 118 threaded through the second vertical support bracket 78 attaches to a third support bracket 120, which is in turn attached to inner frame 20. Rotation of thumbscrew 118 results in movement of the centerline of the film in the Y-axis.

Although the above description and drawings are directed to application of the device in a photographic printer by way of example, the drive is equally suited to adaptation to a variety of color analyzers and editing devices often found in the commercial photographic environment. Having thus described my invention, it will be apparent that numerous obvious adaptations of the same may be made without varying from the substance of the invention hereinafter claimed.

I claim:

1. A film drive mechanism for transporting reels of photographic negative film through a photographic equipment, such as a printer or a color analyzer which comprises:
   a. A first bracket and a second bracket, said second bracket being removably affixed to said equipment in at least one pre-determined spatial relationship to said equipment and said first and second brackets being mounted to an inner frame which is slidably affixed to an outer frame, thereby allowing linear sliding motion between said inner and outer frames; and
   b. A film feed spool mounted on said first bracket, and disposed so as to permit the transport across said drive mechanism of a continuous roll of negative film;
   c. A film receiving spool mounted on said second bracket, and disposed so as to accept the fed end of said continuous roll of film;
   d. A metering roller mounted on said first bracket, and disposed and adapted for metering a designated portion of said negative film between said first and second spools;
   e. At least one film guide roller located between said feed spool and said metering roller;
   f. Drive means for said metering roller for selectively positioning a single negative frame located on a reel of negative film in a pre-determined position between said feed and receiving spools;
   g. Tensioning means for applying a pre-determined tension to the portion of said film disposed between said first and second spools during said transport.

2. The apparatus of claim 1 which further comprises means for sensing and decoding machine readable marks located on said negative film.

3. The apparatus of claim 1, wherein said film drive mechanism comprises:
   a. Said metering roller being a cylindrical metering roller;
   b. A non-abrasive coating on the outer surface of said cylindrical metering roller;
   c. Said at least one guide roller associatively mounted on said first bracket in relation to said cylindrical metering roller, but spaced apart therefrom by a distance greater than the thickness of said film;
   d. A stepper motor associatively mounted with said cylindrical metering roller for incrementally rotating said cylindrical metering roller;
   e. At least one additional guide roller associatively mounted on said first bracket in relation to said cylindrical metering roller, but spaced apart therefrom by a distance greater than the thickness of said film; and
   f. Means for selectively operating said stepper motor.

4. An apparatus as described in claim 1, wherein said at least one film guide roller further comprise a roller shaft and at least one movable and relocatable collar on said shaft.

5. The apparatus of claim 1, which further comprises a sensor for determining the position of said inner frame in relation to said outer frame, and means for positioning the longitudinal centerline of said film in a predetermined relationship to said equipment based on said position.

6. The apparatus of claim 2, which further comprises means for using said decoded information to operate said equipment.

* * * * *